United States Patent [19]

Weaver et al.

[11] Patent Number: 4,772,835
[45] Date of Patent: Sep. 20, 1988

[54] INTERACTIVE MULTIAXIS ENCODER POSITIONING SYSTEM

[75] Inventors: James M. Weaver, Ambler; Dipak I. Patel, Elkins Park, both of Pa.

[73] Assignee: Kulicke and Soffa Industries Inc., Willow Grove, Pa.

[21] Appl. No.: 58,185

[22] Filed: Jun. 4, 1987

[51] Int. Cl.$^4$ .................... G12B 1/00; G05B 1/06
[52] U.S. Cl. ..................... 318/640; 318/575; 318/653
[58] Field of Search ............... 318/565, 567, 575, 577, 318/640, 648, 649, 652, 653

[56] References Cited

U.S. PATENT DOCUMENTS 4,654,571  3/1987  Hinds .......................... 318/640 X

FOREIGN PATENT DOCUMENTS 0717731  2/1980  U.S.S.R. .......................... 318/640
0760138  8/1980  U.S.S.R. .......................... 318/640

OTHER PUBLICATIONS

D. J. Lasky, "Split Optics Alignment Apparatus", IBM Technical Disclosure Bulletin, vol. 11, No. 7, Dec. 1968, pp. 798–799.
B. R. Brown, "Optical Light Pen System", IBM Technical Disclosure Bulletin, vol. 12, No. 12, May 1970, p. 2286.
H. M. Sierra "Information Storage and Retrieval", IBM Technical Disclosure Bulletin, vol. 13, No. 6, Nov. 1970, pp. 1638–1640.
Palmer et al., "Optical Tachometer", IBM Technical Disclosure Bulletin, vol. 16, No. 4, Sep. 1973, pp. 1214–1217.

Primary Examiner—Bentsu Ro
Attorney, Agent, or Firm—John B. Sowell

[57] ABSTRACT

An interactive multiaxis encoder positioning system is provided for positioning a tool or a work piece to a degree of accuracy which is only limited by the encoder system and not the mechanical guides, slides and bearings of prior art systems. A highly precise and accurate multiaxis scale comprising a plurality of sets of grading indicia is made under accurate manufacturing conditions. The multiaxis scale is attached to a fixed or a moving part of the machine or apparatus and is positioned juxtaposed encoder means to provide relative movement to the grating scale means. Thus, the accuracy of positioning a tool or work holder is determined by the accuracy of the encoder and not by the accuracy of the mechanical positioning guides, slides and bearings.

10 Claims, 3 Drawing Sheets

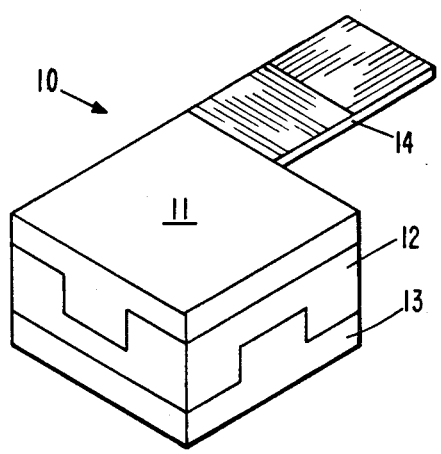
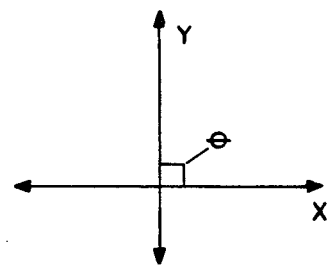
Figure 1        Figure 2
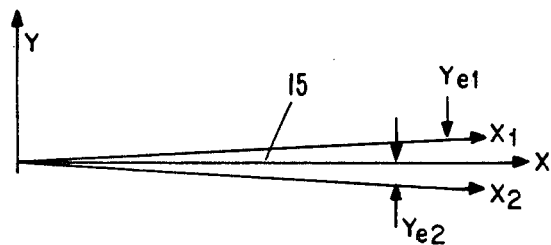
Figure 3
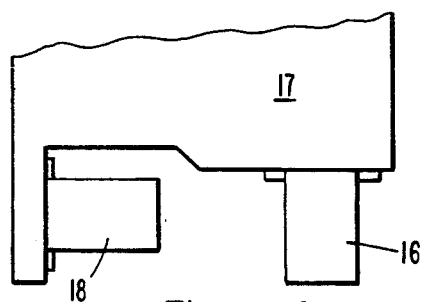
Figure 4
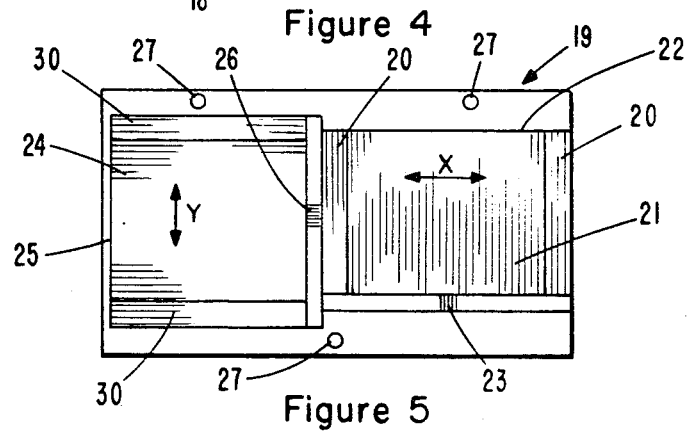
Figure 5

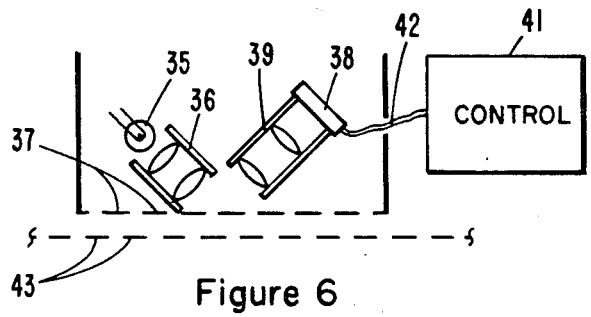
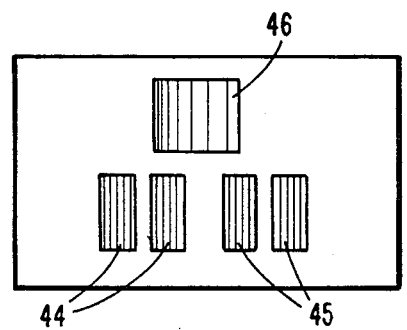
Figure 6
Figure 7
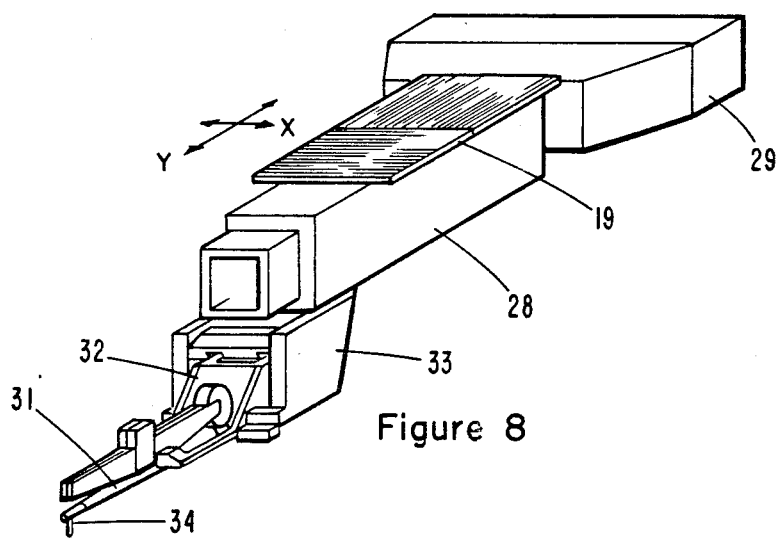
Figure 8
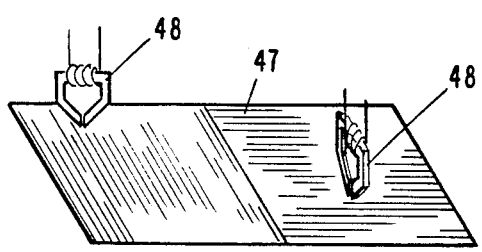
Figure 9

INTERACTIVE MULTIAXIS ENCODER POSITIONING SYSTEM

BACKGROUND OF THE INVENTION

1. Field of the Invention

The present invention relates to an interactive multiaxis encoder system capable of accurately positioning a tool or a support platform. More particularly, the present invention relates to a novel encoder system which enhances the positioning accuracy of manufacturered guides, slides and bearing systems for mechanically positioning tools and support platforms.

2. Description of the Prior Art

Heretofore systems which could be designated as multiaxis positioning systems were not interactive. Prior art positioning systems employed encoders with scales which were sensed by encoders to determine the direction of movement of a single axis. As an example, prior art X-Y tables used in the semiconductor industry are positioning in the X direction by sensing signals from the X direction encoder-sensor. If the movement of the table or platform along the X axis is not perfectly parallel to the theoretical X axis, there is a slight angular diversion which includes an increment Y axis movement. The prior art Y axis encoder-sensors are incapable of sensing this incremental Y axis error. Thus, for purposes of this invention the term interactive and multiaxis refers to the ability to sense movement in the X or Y direction when the positioning encoder system is moving in the orthogonal direction.

Manufacturers of X-Y tables were and still are being requested by consumers and users of X-Y tables to provide greater accuracy of orthogonality and movement. The prior art response has been to manufacture more accurate and more expensive guides, slides, bearings, encoders, sensors and scales not realizing that a part of the problem is that the machine guides and mechanical components of these mechanical systems changed their dimensions and tolerances when incorporated into a positioning system and are placed in use under strained conditions. Changes in the stress of the moving parts or in the temperature of the moving parts and the differential temperature of the moving parts as well as changes in friction, lubrication and contamination all affect the accuracy of movement of X-Y tables and other types of positioning apparatus.

It is possible to make semiconductor masks for use in manufacturing semiconductors with defined lines having a width of less than one micron. To achieve such small accurate widths it is necessary to align a large number of such mask over the same line during different process steps, thus, it is desirable to repeatedly achieve positioning accuracies in the order of 1/100th of a micron which is straining the ability of the manufacturers positioning equipment to produce such equipment at any price.

It would be extremely desirable to provide a multiaxis positioning system which is extremely accurate and cheap to manufacture which would permit positioning accuracy independent of the accuracy of the mechanical guides, slides and bearings of the positioning system.

SUMMARY OF THE INVENTION

It is a principal object of the present invention to provide an interactive multiaxis encoder positioning system having very high precision and low cost.

It is another principal object of the present invention to provide a positioning system with an integrated multiaxis encoder that is more accurate than a mechanical positioning system.

It is another principal object of the present invention to provide a multiaxis grating scale which enables positioning of a tool or work holder platform to the degree of accuracy of the multiaxis grating scale rather than the positioning accuracy of the servo drive and mechanical positioning system.

It is a general object of the present invention to provide a novel moving multiaxis grating scale and moving encoder sensor (or vice versa) system for use in new positioning systems or as components for retrofitting existing equipment to increase their accuracy.

According to these and other objects of the present invention there is provided a multiaxis grating scale having a plurality of sets of marking indicia capable of being sensed by encoder-sensors. When the grating scale is moved in an X axis direction, the Y axis encoder senses any change in the Y direction movement due to actual misalignment of mechanical guides etc. and corrects the Y direction misalignment leaving only a true X axis movement.

BRIEF DESCRIPTION OF THE DRAWINGS

FIG. 1 is an isometric drawing of an X-Y table having a grating scale encoder attached to the top X-Y moving stage;

FIG. 2 is a schematic vector representation of the desired theoretical movement of the top stage of an X-Y table or platform;

FIG. 3 is a schematic vector representation of the actual movement of a mechanical positioning system showing the orthogonal error which is produced by linear movement;

FIG. 4 is a plan view showing a pair of preferred embodiment optical encoder read heads;

FIG. 5 is a plan view of a preferred embodiment multiaxis grating scale for use with the optical encoder read heads of FIG. 4;

FIG. 6 is a schematic elevation and cross section illustrating the operation of an optical shutter type encoder;

FIG. 7 is a schematic view of the bottom of the optical encoder of FIG. 6;

FIG. 8 is a isometric view of a bonding head support of the type movable in the X and the Y directions for use in semiconductor wire bonders;

FIG. 9 is a schematic drawing of a modified magnetic grating scale which may be used in place of the optical shutter type encoder;

DESCRIPTION OF THE PREFERRED EMBODIMENT

Figure 10:
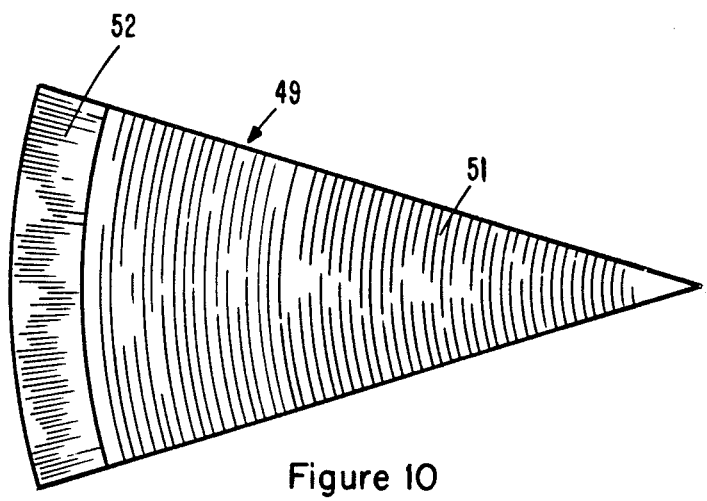
FIG. 10 is a schematic view of a pivoted vector shape grating scale for sensing linear and rotational movement.

While the present invention is illustrated for use with X-Y tables and with grating encoders which may be employed with automatic wire bonders, it is to be understood that the present invention is also applicable to all types of multiaxis machinery which require very high accuracy in positioning. Further, while the preferred embodiment encoder is illustrated with a fixed optical shutter type encoder it will be understood that fixed lead magnetic encoders and laser encoders and other types of encoders could be adapted for use in the present invention. For example, in the computer industry and the compact disk industry both lasers and magnetic heads are moved relative to pre recorded tracks and are capable of determining the position or movement of the reading heads. As will be explained hereinafter the shutter type optical encoder provides an extra degree of accuracy at low cost and reliability when employed with optical mask gratings.

Refer now to FIG. 1 illustrating an X-Y table 10 having a top stage 11 movable in both the X and Y directions. The top stage 11 is mounted on a middle stage 12 which is restricted to movement in the X direction but provides guide means for movement of the top stage 11 in the Y direction. Both top and middle stages 11 and 12 are supported by the bottom or base stage 13. In order to sense the X-Y movement of the top stage 11, a grating scale encoder 14 is shown attached to top stage 11. Such X-Y tables are well known in the prior art and their limitations for precise orthogonality and linearity are set forth in the manufacturers specifications for such tables.

Refer now to FIGS. 2 and 3 which are applicable to all X-Y positioning systems. FIG. 2 shows the desired theoretical movement of any X-Y positioning apparatus wherein the movement in the Y direction is exactly 90° to the movement in the X direction and there is no interaction between the movement of the two stages. Since it is impossible to build theoretically perfect X-Y positioners whenever a stage moves in one desired linear direction there is a deviation or error in the orthogonal direction as illustrated in FIG. 3. For example, if the theoretical direction of movement is shown by the X vector 15, the true movement may be in the X1 direction or in the X2 direction due to the fact that the angle theta shown in FIG. 2 is more or less than 90°. The resulting movement in the X direction is an error and is shown as $Y_{e1}$ and $Y_{e2}$ which results from less than and more than a 90° orientation of the X-Y stages. Even when an X-Y table is made and tested at the point of manufacturer to have acceptable manufacturers specifications for orthogonallity this does not mean that it will maintain this orthogonallity when placed in conditions of stress or extreme temperature variations as often occurs in a manufacturing environment.

Refer now to FIG. 4 which is a plan view showing a pair of encoder read heads of the type employed for sensing movement of an optical grating scale. Such optical shutter type encoders are commercially available from such manufacturers as Heidenhain and are often referred to as Heidenhain transducers. Such encoders are also available from Renco, Teledyne-Gurley and Hewlett Packard among others. Encoder read head 16 is mounted on a fixed support 17 for reading the gradient lines on a grating scale that move in the X direction and is thus the X direction encoder. Encoder 18 is mounted on fixed support 17 for reading gradient lines which move in the Y direction.

The grating scale shown in FIG. 5 is adapted to be read by the X and Y encoder read heads 16 and 18 shown in FIG. 4. If the encoders are arranged opposite each other, one grating scale is arranged facing up and the other down opposite its respective encoder. Grating scale 19 comprises a field of vertical lines 21 having a length 22 which is longer than the linear travel of the tool or platform to be sensed. The marginal or end portions 20 of the length of field 21 comprise an overrun area required by the width of the shutter of the encoder to be explained hereinafter. A small reference grid 23 is also provided for establishing a home or zero position of the moving grid. A field of horizontal grating lines 24 is also provided with end portions 30, thus, has a length 25 which is greater than the movement to be sensed in the Y direction. A Y reference grid 26 is provided for zeroing or homing the grating scale in the Y direction. In the preferred embodiment of the present invention the grating scale may be manufactured by the same process employed to manufacture mask for the production of semiconductors. Thus, it is possible to define lines or grids having a width less than 1 micron. In the preferred embodiment of the present invention commercially available optical encoders are provided with shutters having 10 micron to 40 micron grating pitch. In the preferred embodiment of the present invention a linear transducer or encoder model LIDA190 is provided which has a 40 micron grating pitch and using techniques known as subdivision measuring steps an accuracy of positioning of 4/10th of 1 micron is achieved. Thus it will be understood that for wire bonders and die bonders a positioning accuracy of 4/10ths of 1 micron is superior to anything presently available in the prior art. If the present invention is applied to the highest accuracy optical encoder for use in mask aligners it is possible to achieve an accuracy of positioning of 1/10th of 1 micron. Since the state of the art now permits grating lines or grating pitch to be made to an accuracy down to less than 1 micron, it is theoretically possible using the present invention to achieve positioning accuracy of 1/100th of a micron. However, it will be understood that once it is attempted to make grating lines on a pitch less than 1 micron that the wave length of light used to observe the grating spacing will no longer permit exact resolution of the grating pitch. Apertures 27 are provided in the marginal areas of the grating scale 19 for mounting the grating scale encoder onto a moving object such as a bonding head.

Refer now to FIGS. 8 and 6 showing grating scale 19 mounted on a moving bonding head support 28. The support 28 is connected at one end to the moving coil 29 which provides the force movement in the Y direction. The bonding head support 28 is connected to another such linear motor (not shown) for movement in the X direction. The bonding transducer 31 is shown mounted on a support 32 which is pivoted on a downward extending arm 33 of the bonding head support 28. It will be understood that the bonding transducer 31 and transducer mounting support 32 may be mounted on an X-Y table of the type shown in FIG. 1 and the grating scale encoder 19 may be attached to the top stage 11 of the X-Y table 10 to provide precise positioning of the transducer 31 and the bonding tool capillary or wedge 34. FIG. 6 shows a schematic elevation in cross section of a preferred embodiment optical shutter type encoder for sensing the X and Y movement of the grating scale 19 of FIG. 8. Light means 35 provides collimated light via optical system 36 which is directed onto the shutter pattern 37 of the encoder read heads of the type shown in FIG. 4. The reflected light is focused or projected onto photocell or photoelectric device 38 via optical means 39. The signal from the photoelectric device 38 is applied to the control means 41 via connecting wires 42 to provide an analog signal indicative of the relative position of the shutter pattern 37 to the grating lines 43 which are representative of the grating lines 21 and 24 shown in FIG. 5. When the rays of light shine through the space between the shutters 37, the rays may be reflected by the grating pattern 43. The rays of light which are directed onto the shutters 37 are absorbed and are not reflected to the photoelectric cell or sensor. It will be understood that various amounts of light are reflected as the shutter and grating lines are positioning relative to each other and the analog signal on line 42 to control 41 is a sinusoidal output which may be processed to not only count the lines but to electronically interpolate the position of the lines relative to each other. The above-mentioned encoder manufacturers also provide shutter type encoders in two parts where the light source 35 is on the opposite side of the grating 43. FIG. 7 is an enlarged view of the bottom of a preferred embodiment optical encoder showing a first pair of shutters 44 and a second pair of shutters 45 separated from each other so as to permit the interpretation of the movement or phase of the analog signal. Thus, two analog signals are provided to control means 41 from the pairs of shutters 44 and 45 to determine magnitude as well as direction of movement. A third shutter 46 is provided in the preferred embodiment optical encoder which has grid lines that are separated from each other on a varying or diminishing pitch grid. The grid pattern or shutter 46 is employed to read the reference marks 26 and 23 referred to herein before for establishing the zero or home position of the moving grid.

Refer now to FIG. 9 showing a modified grating scale using magnetic grating lines and magnetic reading heads. The grating scale 47 has magnetic indicia which cannot be visually observed but is illustrated having X and Y directions. Such magnetic grating scales may be separated on a grating pitch of two to three microns as is well known in the magnetic information storage field employing Winchester type disks. The magnetic heads 48 employed for reading such fine division grating lines are magnetic plating heads of the type used with Winchester disk drives. It will be understood that FIG. 9 is schematic drawing and that a plurality of X read heads and Y read heads will be required to read both phase and magnitude of direction. It will be understood that a plurality of laser beams may be employed to read indicia or grid markings on a plastic support or media similar to a compact disk to achieve phase and magnitude direction using laser read heads.

Refer now to FIG. 10 showing a plan view of a pivoted sector shaped grating scale 49 for sensing both linear and rotational movement. The grating scale 49 is provided with radial grating lines 51 which permit sensing of movement in the radial direction and rotational grating lines 52 which are orthogonal thereto for sensing movement in the theta or rotational direction.

Figure 11:
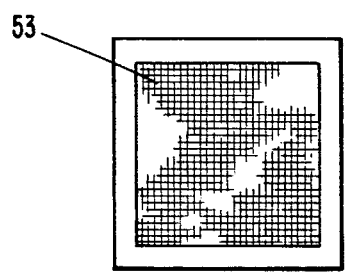
FIG. 11 is a schematic view of an X and a Y grating scale superimposed provide an orthogonal grating scale for sensing movement in the X and Y direction.

Refer now to FIG. 11 which is a schematic view of a grating scale having both X and Y grating scale patterns superimposed mutally perpendicular or orthogonally to provide a grating scale capable of sensing movement in the X and Y direction. It will be understood that the amount of light reflected is diminished by a factor of 50% when the grating scales are superimposed one over the other.

Figure 12:
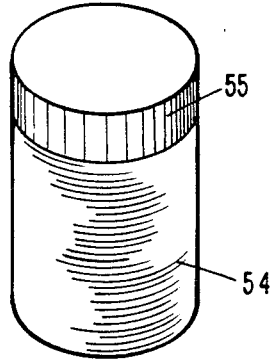
FIG. 12 is a schematic view of a cylindrical shaped grating scale of the type which may be employed for sensing rotational and axial movement.

Refer now to FIG. 12 showing a cylindrical shape grating scale having a Z axis or vertical axis set of grating lines 54 and a rotational set of grating lines 55 for sensing rotational movement.

Figure 13:
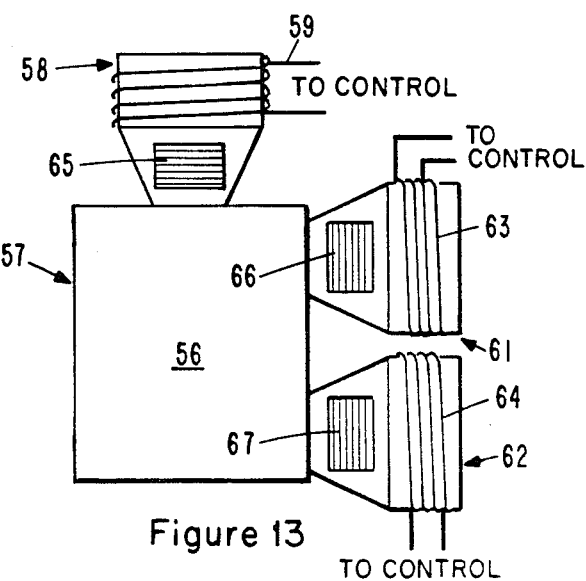
FIG. 13 is a plan view of the top stage of an X-Y table which is moved or driven by three linear motors to achieve X-Y and rotational movement.

Refer now to FIG. 13 showing the top stage 56 of an X-Y table 57. It will be understood that this top stage 56 of X-Y table 57 is free to move in a rotational directional direction as well as an X and a Y direction. The Y drive motor 58 is provided with a coil 59 which is connected to a controller of the type shown in FIG. 6. X drive motors 61 and 62 are provided with coils 63 and 64 which are also connected to the aforementioned controller. In the embodiment of FIG. 13 the elements of the grating scale have been separated from a single mask or card and are placed on the coil mounting supports of the motors 58, 61 and 62. The Y grating scale 65 is adapted to be moved in the X and the Y direction. The two X grating scales 66 and 67 are adapted to be moved in the X direction and incrementally one of the grating scales 66 or 67 may be moved more than the other to provide a rotational movement of the top stage 56 of the X-Y table 57. It will be understood that in certain types of bonding equipment and mask aligners that only a very small rotational movement is required and can be provided employing the present invention grating scales. In the modified embodiment of FIG. 13 it is important that the grating scales 65, 66 and 67 be placed on the coil supports of the motors 58, 61 and 62 precisely orthogonal to each. If means are not available for achieving precise orthogonality it is best to manufacture the grating scales on a single card or mask.

Having explained a preferred embodiment of the present invention and modifications thereof, it will be understood that the present multiaxis encoding system can be applied to prior art mechanical positioning systems to provide new and improved accuracy and performance at lower cost than was heretofore possible in the prior art. While the invention has been explained with machines and apparatus which are best utilized with a moving grating system, there are apparatus and machines such as X-Y plotters and drafting machines which would benefit by mounting the encoding head or sensing head on the moving tool and moving the encoder relative to the grading scale pattern. Thus, it will be understood that the present invention enables manufacturers to achieve X-Y theta positioning to an accuracy that is only limited by the type of encoder employed and is no longer limited by the mechanical slides, guides and bearings of the moving systems.

The true position of a table or platform is now directly readable without building precise orthogonal movement into the table or platform. Since the grating encoder embodies the means for multiaxis orthogonal accuracy, it is no longer necessary to build and test the accuracy into the X-Y tables or platforms as was done in the prior art with encoders which only had a narrow linear band dedicated to a single axis.

It will be understood that the grating scale may be mounted on a moving tool support or platform to determine a true X or Y axis of movement. Either the platform (table) or the grating scale may be moved and even adjusted to achieve accurate linear movement in a preferred linear direction.

What we claim is:

1. An interactive multiaxis encoder positioning system comprising:
   fixed support means,
   movable support means,
   multiaxis scale means mounted on one of said support means for relative movement to a sensor in a plurality of directions,
   at least two of said plurality of directions of movement being orthogonal to each other,
   said multiaxis scale means comprising sets of readable indicia having gratings of parallel lines that are manufactured on a common base as an integral unit and are orthogonal to each other,
   said gratings of parallel lines being constructed to the predetermined accuracy of linearity and orthogonality desired when positioning said movable support means,
   encoder sensor means mounted on the other of said support means for sensing relative movement of said sets of indicia,
   servo motor means for moving said movable support means,
   control means coupled to said servo motor means and to said encoder sensor means for positioning said gratings of parallel lines relative to said encoder sensor means independant of misalignment of said movable support means to said fixed support means.

2. An interactive multiaxis encoder positioning system as set forth in claim 1 wherein said sets of indicia comprise two orthogonal gratings of parallel lines having two separate grating fields adjacent to each other.

3. An interactive multiaxis encoder positioning system as set forth in claim 1 wherein said sets of indicia comprise two orthogonal gratings of parallel lines having two grating field superimposed one on the other.

4. An interactive multiaxis encoder positioning system as set forth in claim 1 wherein each set of readable indicia comprises a grating field of length longer than the direction of movement of the movable support means in the length direction and whose grating field width is wider than the direction of movement of the movable support means in the width direction.

5. An interactive multiaxis encoder positioning system as set forth in claim 4 which includes at least one reference grating associated with each said grating field for enabling said encoder sensor means to sense a zero or homing position.

6. An interactive multiaxis encoder positioning system as set forth in claim 1 wherein said multiaxis scale means comprising a cylinder having a set of vertical or theta grating lines and a set of horizontal or Z grating lines thereon, both sets of grating lines are orthogonal to each other in the direction of movement to be sensed.

7. An interactive multiaxis encoder positioning system as set forth in claim 1 wherein said multiaxis scale means comprises a sector shaped grating scale having a set of cylindrical shaped circular grating lines and a set of radial shaped theta grating lines orthogonal thereto.

8. An interactive multiaxis encoder positioning system for accurately positioning a tool relative to a work piece in two orthogonal directions, comprising:
   a fixed frame,
   a movable frame mounted on said fixed frame for supporting either the tool or work piece,
   a multiaxis encoder scale mounted on said movable frame and movable therewith,
   said multiaxis encoder scale comprising a field of X grating lines having a length and width larger than the predetermined movement of the tool or work piece and a field of Y grating lines having a width and length larger than the predetermined movement of the tool or work piece,
   said X grating lines and said Y grating lines of said encoder scale being constructed to the predetermined accuracy of linearity and orthogonality desired when positioning the tool or work piece,
   a first linear encoder sensor positioned juxtaposed said X grating lines for generating electric signals indicative of relative movement to said X grating lines,
   a second linear encoder sensor fixed relative to said first linear encoder and being positioned juxtaposed said Y grating lines for generating electric signals indicative of relative movement of said encoder to said Y grating lines,
   servo motor means for moving said multiaxis encoder scale or said encoder sensor relative to said fixed frame,
   control means coupled to said servo motor means and said linear encoder sensors for moving said multiaxis encoder scale and said tool or work piece to a predetermined position relative to said X and said Y grating lines independent of misalignment of said movable frame to said fixed frame.

9. An interactive multiaxis encoder positioning system as set forth in claim 8 wherein said linear encoder sensors are fixed and said multiaxis encoder scale is moved with the tool to provide accuracy of movement of the tool to the degree of accuracy incorporated into the encoder scale.

10. An interactive multiaxis encoder positioning system as set forth in claim 9 wherein any misalignment of said movable frame is sufficient to cause Y directional error movement of said tool in response to only X directional linear movement by said electric signals, and whereby said second linear encoder sensor senses said Y directional error movement and automatically corrects said Y directional error movement to the degree of accuracy incorporated in said encoder scale.

* * * * *